Aug. 12, 1930.  H. FORD  1,772,481
BRAKE
Filed May 31, 1927   2 Sheets-Sheet 1

INVENTOR.
Henry Ford.
BY
ATTORNEY.

Aug. 12, 1930.  H. FORD  1,772,481
BRAKE
Filed May 31, 1927   2 Sheets-Sheet 2

INVENTOR.
Henry Ford.
BY
ATTORNEY.

Patented Aug. 12, 1930

1,772,481

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE

Application filed May 31, 1927. Serial No. 195,276.

The object of my invention is to provide a brake of simple, durable and inexpensive construction.

A further object of my invention is to provide a brake especially adapted for the front or steering wheels of an automobile.

Still a further object of my invention is to provide a brake structure in combination with a wire wheel wherein the inner surface of the wire wheel hub may form the brake drum.

Still a further object of my invention is to provide an adjusting means for taking up the wear of the brake shoes, wherein the operation of the brake does not place any appreciable strain on the adjusting device.

Still a further object of my invention is to provide a front axle having a hollow spindle bolt fixed therein with a support at one end of the said spindle bolt whereby the brake actuating member may extend through the hollow spindle bolt, and the brake operating shaft may be journalled in said support in a position to actuate the brake actuating member.

Still a further object of my invention is to provide a front axle with a hollow spindle bolt at the end thereof, through which the brake operating rod may extend, and to mount the brake operating shaft on the spring perch and spindle bolt whereby a compact structure which is readily protected from the weather may be secured.

Still a further object of my invention is to provide a front axle with a hollow spindle bolt therein, said bolt having a recess in the head thereof adapted to form a housing for the brake operating mechanism.

Still a further object of my invention is to provide an anchor plate having a pair of shoes mounted thereon, and pivoted together at one end, one end of one of said shoes being anchored to the brake anchor plate, and to provide a bell crank lever, one arm of which is anchored to the free end of the brake shoes, and the other arm is extended to position to be operated by a rod extending through the spindle bolt.

With these and other objects in view my invention consists in the arrangement, construction, and combination of the various parts of my improved device as described in the specifications, claimed in the claims and illustrated in the accompanying drawings in which:

Figure 1:
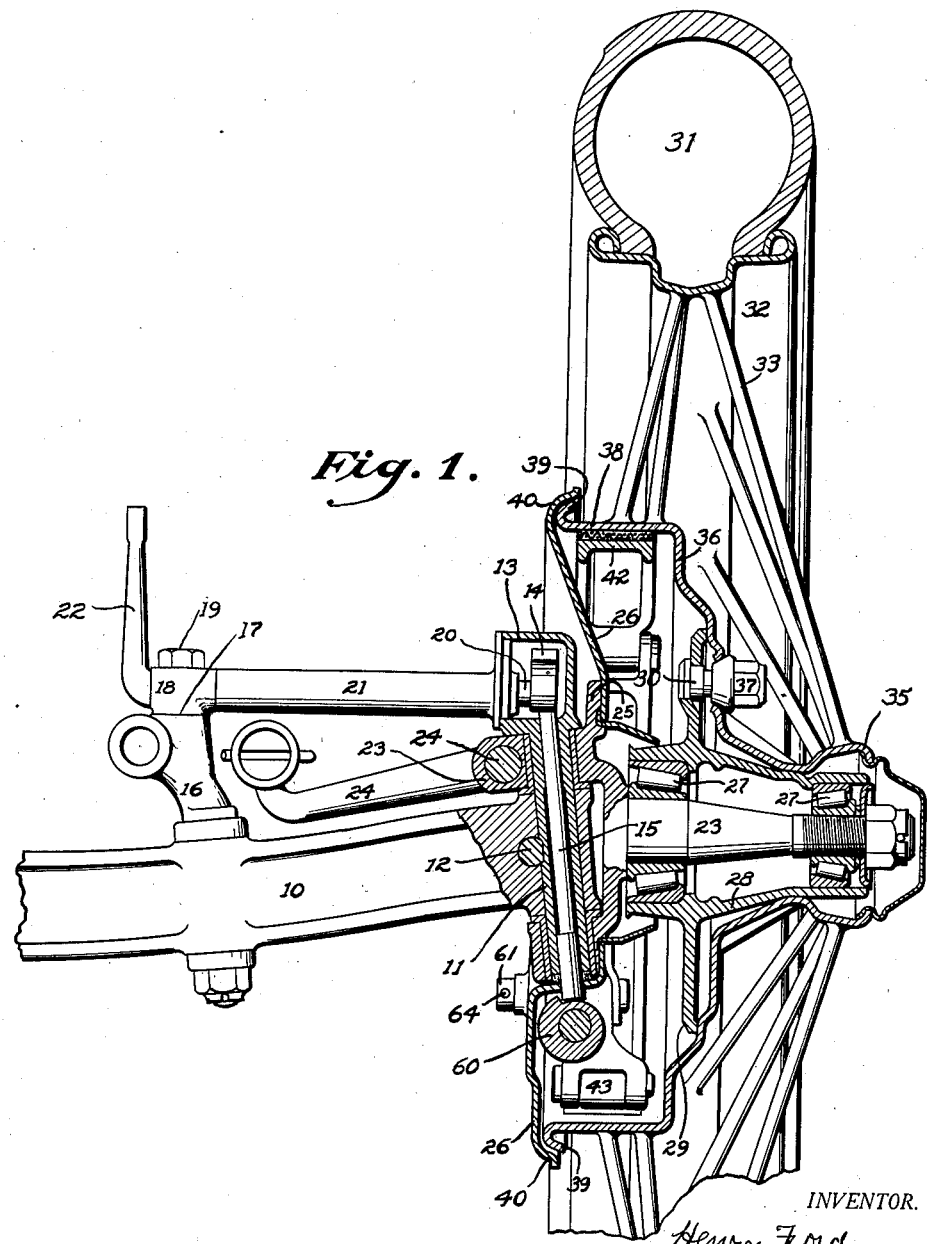
Figure 1 shows a vertical, central, sectional view through a wheel spindle and the adjacent portion of a front axle for an automobile.
Figure 2:
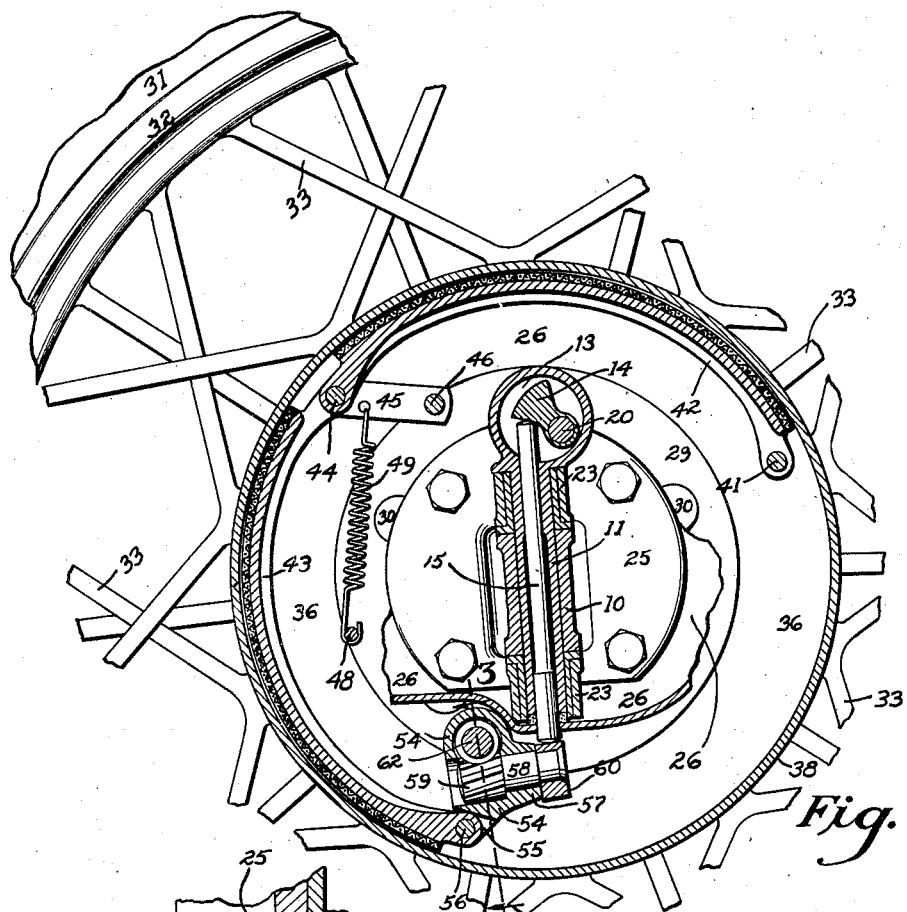
Figure 2 shows a view taken at right angles to the plane of Figure 1 and showing the spindle bolt and wheel hub in section to better illustrate construction.

Referring to the accompanying drawings, I use the reference numeral 10 to indicate generally the front axle of an automobile. This axle is provided with an inclined bore at the end thereof, designed to receive the hollow spindle bolt 11. The spindle bolt 11 may be anchored in place on the axle 10 by a flattened pin 12. The upper end of the spindle bolt 11 is recessed to form a housing 13 for the brake operating cam 14. Extending through the hollow spindle bolt 11 is a brake actuating rod 15.

Near the end of the axle 10, a spring perch member 16 is provided with a flat upper surface 17, whereby a bearing member 18 may be screwed thereon, as by screw 19. A brake operating shaft 20 is journalled in the bearing 18 and in a shaft housing 21. Any convenient means for rotating the brake operating shaft 20 may be provided, such as, a lever 22 formed at the inner end thereof which in turn may be connected to a brake rod or any other suitable actuating means.

A forked spindle 23 has its forked ends rotatably mounted on the spindle bolt 11 and may be swung on the spindle bolt by swinging the steering arm 24. This steering arm may be actuated in any of the well known ways in which they are actuated in an automobile. In this connection it will be noted, that I have provided a spindle bolt which has its axis intersecting the center of the place of contact of the tire with the road so that the spindle bolt has its upper end tilted toward the longitudinal center of the vehicle. The spindle 23 is provided with an annular flange 25 adjacent to the spindle bolt 11 and a brake anchor plate 26 is secured to the flange 25 in any suitable manner.

Adjacent to its outer end, a pair of spaced roller bearings 27 are mounted on the spindle 23, and a permanent hub member 28 is mounted on these rollers 27 for rotation. This hub member 28 is provided with an annular outwardly extending flange 29 which is provided with a plurality of spaced openings designed to have wheel bolts 30 fixed therein. I provide a wheel member having the tire 31 mounted on a rim 32 which is connected by permanently welded spokes 33 with a wheel hub member 35. This wheel hub member is provided with a contracted portion adjacent to its outer end which is designed to center on the permanent hub member 28. Intermediate of the ends thereof, this hub member 35 is provided with an annular outwardly extending flange 36 which has openings therein which register with bolts 30 whereby nuts 37 may be run down on the bolts 30 to secure the hub 35 and consequently the wheel member onto the permanent hub 28.

At the outer edge of the flange 36 a rim 38 is formed which forms a brake drum for my improved brake. It will be noted that this rim 38 not only is a brake drum, but also has the wire spokes 33 welded thereto whereby this portion of the wheel hub 35 is both a hub member and a brake drum. The inner edge of the brake drum is provided with a rolled over flange 39 which coacts with an inturned flange 40 on the brake anchor plate 26, to form a water and dirt shield for the brake mechanism housed within the wheel hub member and the brake anchor plate. It will be seen that the flange 39 will throw off in rotating, any material such as water or mud by centrifugal force, whenever such material would tend to flow into the space between the anchor plate and brake drum. The inturned flange 40 on the anchor plate prevents any such material from approaching the space between the wheel hub and the anchor plate in such a way that it will not contact with the revolving surfaces of the wheel hub.

I preferably use what is termed a 2-shoe self energizing brake shoe in connection with my improved brake. In this construction, an anchor pin 41 is fixed to the brake anchor plate 26 in any suitable manner. One end of one of the brake shoes (to which I have given the reference numeral 42) is pivotally mounted on the anchor pin 41. A second brake shoe 43 is pivotally connected to the free end of the first brake shoe as by pin 44. The pivot pin 44 has a pair of links 45 pivoted thereto and these links are pivoted on an anchor pin 46, which is suitably secured in the brake anchor plate 26.

As the brake shoe 42 is pivotally mounted at two places, it will swing both on pin 41 and pin 46. There is sufficient play in the bearings and spring in the parts to permit this swinging on two centers as the swinging movement is very slight. A pin 48 is secured in the brake anchor plate 26 at a distance from links 45 and the contracting spring 49 is extended between the pin 48 and the links 45 to tend to draw the brake shoe 42 to its position out of contact with a brake drum.

Figure 3:
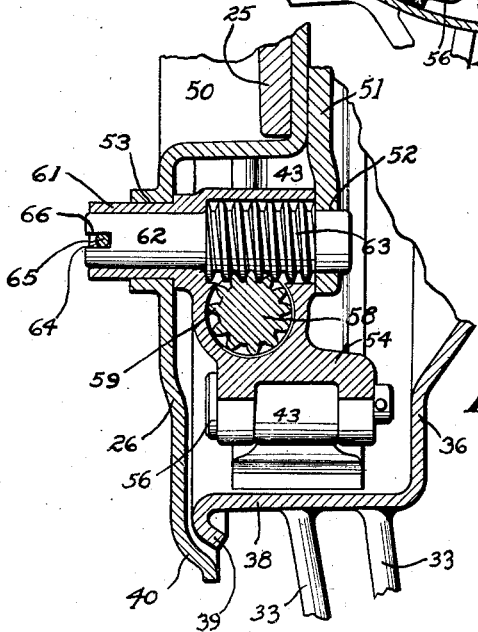
Figure 3 shows a vertical, enlarged, sectional view, taken on the line 3—3 of Figure 2.

It will be noted that the spindle bolt is tilted so that its lower end extends to position within the lines of the brake drum. The brake anchor plate is recessed to receive the lower end of the spindle bolt and also the lower fork of the spindle 23 as is illustrated in Fig. 3 at 50. It will be seen that this recess causes the anchor plate to be offset somewhat whereby a clip 51 may be secured to the offset portion thereof, and aligned openings may be formed in said clip and brake anchor plate as at 52 and 53 to form bearing openings for the brake operating bell crank lever 54. One arm of this bell crank lever 54 is bifurcated at 55 so that the free end of the second brake shoe 43 may be pivoted to the said bell crank lever, by the pivot pin 56. The second arm 57 of this bell crank lever is provided with a longitudinal bore in which a shaft 58 is journalled. One end of this shaft 58 is provided with integral worm teeth 59 and the opposite end thereof is designed to have a cam member 60 secured thereto in any suitable manner as by riveting. This cam member contacts with the lower end of the brake actuating rod 15, due to the pull of spring 49. It will thus be seen that if the brake operating shaft 20 is rotated then the brake operating cam 14 will slide the brake actuating rod 15 through the king pin 11 to thereby press downwardly on the brake adjusting cam 60 which in turn will swing the brake operating bell crank lever 54 which in turn will swing the free end of the brake shoe 43 outwardly toward the brake drum 38. As soon as any portion of the shoe 43 contacts with the revolving drum 38 when vehicle is going forward, then the frictional contact will tend to throw the shoe 42 on its pivot 41 out against the brake drum 38 whereby the pressure on the brake operating shaft and the movement of the vehicle will energize the brake shoes 42 and 43. If the pressure on the brake operating shaft 20 is released, then the spring 49 will draw the shoes 42 and 43 out of contact with the brake drum 38, thereby swinging the bell crank lever on its pivot and returning the remaining parts including the brake operating shaft to their inoperative positions.

The bell crank lever 54 has an integral laterally extending sleeve 61 which is concentric with the pivotal point of said lever and in which an adjusting shaft 62 is journalled.

The outer end of this adjusting shaft 62 is journalled in the opening 52 in the clip 51 and sleeve 61 is journalled in the opening 53 in the brake anchor plate 26 so that these two parts together form a pintle upon which the bell crank lever 54 is swung. The adjusting shaft 62 is provided between its ends with worm teeth 63 which may be formed integral therewith and which coact with the worm teeth 59 on the shaft 58 to rotate said shaft 58 and the cam 60. The sleeve 61 extends somewhat from the brake anchor plate 26 and may be provided with an opening or openings 64 through which a pin 65 may be passed to lock the shaft 62 from rotation.

Referring to Figure 1 it will be noted that the cam member 60 has a shape such that it will tend to swing the bell crank lever 54 on its pintle in proportion to the amount which the cam 60 has been rotated by means of the adjusting shaft 62. Adjustment of this shaft is accomplished in the form of device here shown by removing the pin 65 and inserting a screw driver in slot 66 in the shaft 62 to thereby rotate same. A similar adjustment may be arranged to adjust the anchored end of the shoe 42.

Among the many advantages arising from the use of my improved braking mechanism, it should be first pointed out that I am enabled to dispense with the brake drum normally necessary in connection with a vehicle wheel, by using the hub of the wheel for the drum. In connection with the brake mechanism itself, it will be noted that I have secured a self energizing brake with relatively simple control therefor and a relatively simple mounting therefor. The adjustment used for this brake is not subject to wear from the use of the brake so that the adjusting mechanism should never affect the brake operation in case it should in any way become damaged. It will further be noted that this adjusting mechanism is very simple and may readily be protected from the weather.

Some changes may be made in the arrangement and combination of the various parts of my device without departing from the spirit of my invention, and it is my intention to cover by my claims such changes as may reasonably be included within the scope thereof.

I claim as my invention:

1. In a device of the character described, an axle, a brake mechanism mounted thereon including a brake shoe, a permanent hub member journalled on said axle, a wheel assembly including a combined hub and brake drum member, and means for securing said wheel hub to the permanent hub with the brake drum portion thereof in position to coact with the brake shoe.

2. In a brake mechanism, an anchor plate, a brake shoe pivoted at one end thereto, a bell crank lever pivoted to said anchor plate in position so that one end thereof may actuate the other end of said brake shoe, a brake actuating device, a cam member mounted on the second end of said bell crank lever in a position to coact with the brake actuating device and means for adjusting the position of said cam.

3. In a brake, an anchor plate, a brake shoe mounted thereon, a bell crank lever pivoted to said anchor plate, said bell crank lever having a bore through one arm thereof, a shaft mounted in said bore, a cam mounted on the outer end of said shaft, and means for rotating said shaft, whereby one arm of said lever may actuate said brake shoe and the second arm thereof may be actuated by a brake actuating member and the adjustment of said cam may control the actuation of the brake shoe.

4. In a brake, an anchor plate, a bell crank lever pivotally mounted on said anchor plate, said lever having a bore through one of its arms, a shaft disposed in said bore, a cam member mounted at the outer end of said shaft, a second shaft journalled in said anchor plate with its axis coinciding with the axis of the pivot of said lever, and means for imparting rotation from said second shaft to said first shaft whereby rotation of the second shaft may rotate the first shaft to thereby adjust the position of said cam.

5. In a device of the character described, an axle, a hollow spindle bolt mounted in the end of said axle, a spindle rotatably mounted on said spindle bolt, a brake actuating rod extending through said spindle bolt, and a brake anchor plate secured to said spindle and provided with an offset portion adjacent to the lower end of the spindle bolt and the brake actuating rod whereby the axis of the spindle bolt may be so inclined that the brake actuating rod may be actuated from one side of said brake anchor plate and may extend through the brake anchor plate to actuate the brake mechanism on the opposite side thereof.

6. In a device of the character described, an axle, a brake pivotally mounted on a pivot formed in the end of said axle, a spring perch secured to said axle and spaced from said pivot, a brake operating mechanism, and a housing supported by said spring perch and pivot, said housing forming an enclosure for said mechanism.

7. In a device of the character described, a brake, a brake operating mechanism, an axle having a substantially vertical spindle bolt secured in the end thereof around which the brake may pivot, a spring perch secured to said axle and spaced from the spindle bolt, and a housing supported by said spring perch and spindle bolt forming an enclosure for the operating mechanism.

8. In a device of the character described, a brake, a brake operating mechanism, an axle having a substantially vertical spindle bolt secured in the end thereof around which the brake may pivot, a cup shaped head formed on the spindle bolt, a spring perch secured to the axle and spaced from the spindle bolt, and a housing supported by said head and spring perch co-acting with the head to form an enclosure for said operating mechanism.

9. In a brake, an axle having a hollow spindle bolt secured in the end thereof, a brake operating rod disposed in said bolt, a cup shaped head formed on the spindle bolt, a spring perch secured to the axle and spaced from the spindle bolt, and a housing having a brake operating shaft mounted therein in position to operate said rod supported by said head and spring perch.

10. In a brake, an axle having a hollow spindle bolt secured in the end thereof, a head formed on the spindle bolt having a recess therein, a brake operating rod in said spindle bolt, a spring perch secured to the axle and spaced from the spindle bolt, a tubular housing, and a brake operating shaft disposed in said housing in position to operate said rod, the housing being supported by the spring perch and co-acting with said recess to form an enclosure for the joint between said rod and shaft.

11. In a brake, an axle having a hollow spindle bolt secured in the end thereof, a head formed on the spindle bolt having a recess therein, a brake operating rod disposed in said spindle bolt, a spring perch secured to the axle and spaced from the spindle bolt, and a tubular housing having a brake operating shaft rotatably mounted therein in position to operate said rod, the housing being secured in said recess and to said spring perch to form an enclosure for the joint between said rod and shaft.

HENRY FORD.